Jan. 31, 1928.

H. P. HANSON ET AL 1,657,750

WREATH SUPPORT

Filed April 18, 1927

Inventors
Hans Peter Hanson and
Victor F. Bergman,
By Winfield Williams atty.

Patented Jan. 31, 1928.

1,657,750

UNITED STATES PATENT OFFICE.

HANS PETER HANSON AND VICTOR F. BERGMAN, OF CHICAGO, ILLINOIS.

WREATH SUPPORT.

Application filed April 18, 1927. Serial No. 184,543.

This invention has reference to the decorative arts, and especially to methods and means for displaying plants, flowers, and imitations thereof. The main object of the device is to make an economical wreath, and give to the decorative parts of a wreath, extension, stability, permanency, and greater utility.

Figure 1:
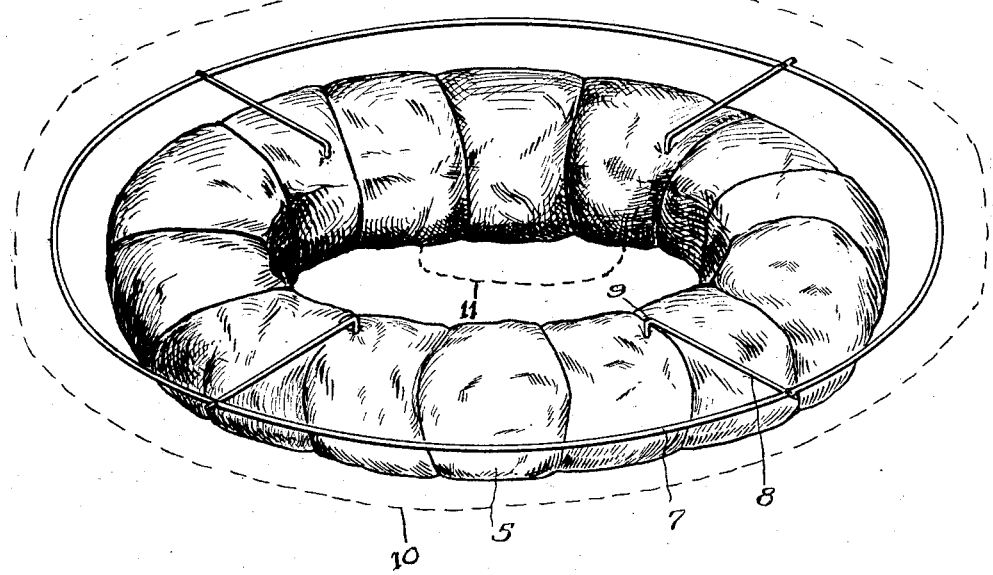
Figure 2:
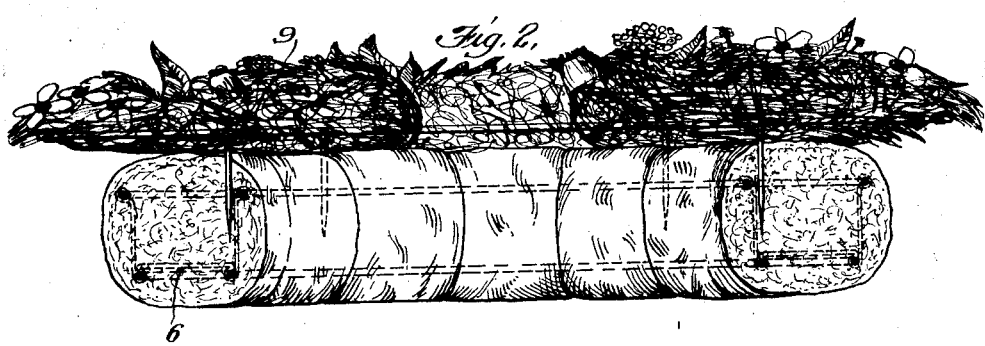
Figure 3:
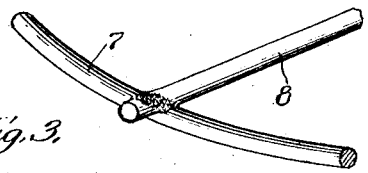

In the drawings we show an embodiment of our invention. Fig. 1 is a perspective of the foundation part of a wreath with our device attached. Fig. 2 is a cut section substantially across the center of Fig. 1. Fig. 3 is a portion of our attachment showing a method of union.

In the floral trade the manufacture of wreaths is a very important part of the trade, and it is commonly known that a very universal device in the manufacture of wreaths is a basic element which might be called a cushion. This cushion serves, among others, two purposes: 1, it gives basic support to the floral decoration; 2, it forms a base to which to attach the decoration. Ordinarily, this cushion is made of moss, or some similar material, which has an inclination to pack and yet preserve enough sponginess to receive and retain moisture; also, having the quality of permitting easy insertion of the stems of decorative plants and flowers, or the easy insertion of materials used to attach decorative plants and flowers. For convenience, economy and service, it is extremely desirable to have consideration for the size of the cushion of the wreath. The support of the cushion being practically at one point, it has been found necessary to build out from the cushion to secure breadth of wreath, and in so doing use has been made of leaves and parts of other plants which involves expense, labor, and skill: and even when so built the built out portion soon loses its supporting quality when exposed to the elements.

Our invention provides a cushion of minimum diameter, with a variable extension, giving breadth and multiplicity of support, the wire extension serving also as a means for easily hanging or attaching to wall supports, for display purposes. Also, the finished wreath may be set on edge at the foot of casket carriers without damage to its floral arrangement or circle. Further, the extension frame serves as a guide in the process of attaching the flowers, and insures a uniform or perfect circle in the finished work.

In the device as illustrated we provide a cushion 5 of the ordinary type used in floral work, and which is ordinarily a metal skeleton 6 of some kind, filled and covered with moss or similar material: the whole covered with some material to keep it intact. We provide a metal frame preferably made of wire, consisting of a circular portion 7 and extending therefrom portions 8 substantially radial to the portion 7; the portions 8 may be bent at 9, at substantially right angles and downwardly from the plane of portion 7; the free ends of the portions 8 being adapted to penetrate the cushion. The portions 7 and 8 may be joined in any manner to make them a unit, but we prefer to spot-weld them. The number of portions 8 are not limited—being of sufficient numbers to give the extension frame rigidity. The dotted lines 10 and 11 suggest something of the covering extent of the fixtures whereby the floral decoration may be built outwardly or inwardly to a complete hiding of the cushion and support; also, the provision of a supporting means which is not affected by the elements. We also provide that we may join the portions 9 to the skeleton 6. The points 9 of the extension frame are attached to the cushion by simply pressing them into the cushion 5.

We do not limit ourselves to the specific forms and description except as we are limited by the claims.

We claim:

1. An article of manufacture for floral decoration comprising a porous cushion having a forming skeleton; a demountable extension structure attached to said cushion whereby to support floral decorations consisting of natural or artificial plants and flowers.

2. An article of manufacture for the purposes specified, for supporting a decorative feature consisting of a basic cushion member and a demountable member attachable thereto whereby to support thereon a substance of greater circumferential area than the circumferential diameter of the cushion.

3. An article of manufacture for floral decoration comprising a reinforced porous cushion; a demountable metal structure attached to said cushion having means to secure a greater circumferential diameter support than the diameter of the cushion and whereby to firmly and permanently support floral decorations consisting of natural or artificial plants and flowers.

4. An article of manufacture for floral decoration comprising a wreath consisting of a porous cushion, a demountable frame attached to said cushion for securing extended supporting surface; a decorative feature superimposed upon and attached to said cushion and said demountable extension; the said floral decoration consisting of natural flowers, foliage, plants; and artificial imitations thereof.

5. An article of manufacture comprising a decorative floral wreath consisting of a basic cushion member composed of a metallic form supporting a porous structure; a demountable metal extension frame forming with said cushion a surface adapted to support a superimposed decoration of larger diameter than the cushion; a decoration superimposed upon said cushion and said demountable extension frame.

6. An article of manufacture comprising a porous cushion having a reinforcing skeleton; a demountable structure attachable thereto of variant circumferential area from the cushion, consisting of a substantially circular portion of wire, a plurality of arms extending therefrom spaced around the circular portion and in the plane thereof; a portion of the arms bent downwardly at substantially right angles thereto; the free ends of the downwardly bent portions adapted to penetrate the cushion and provide means of support for the demountable structure.

7. An article of manufacture constituting a supporting device for a floral decoration comprising a cushion consisting of a reinforced body of porous material; a demountable metal frame adapted to be attached to the said cushion and form an extension base for the support of a floral decoration, said demountable metal extension comprising a substantially circular metal member of proportions varying from the circumferential diameter of the cushion, a plurality of arms fixedly attached to said metal extension and radially projecting therefrom; means to attach the same to the cushion.

8. An article of manufacture for floral decoration comprising a porous cushion having a metal reinforcing skeleton; an extension structure adapted to attach to said metal structure, the said attachable portion having means of union with the metal reinforcing structure, said attachable extension portion having a greater circumferential diameter than the cushion.

9. An article of manufacture for floral decoration comprising a basic porous cushion built upon a metal skeleton; arms extending from said metal skeleton outwardly and radially supporting a substantially circular metal outer form whose circumferential area is greater than the external perimeter of the cushion whereby to rigidly and permanently support a natural or artificial decorative feature thereon, there being means also for the securing of said decorative feature to the said cushion.

Signed at Chicago, Ill., April 14th, 1927.

HANS PETER HANSON.
VICTOR F. BERGMAN.